United States Patent
Gomes Ferreirinho Lima Rodrigues et al.

(10) Patent No.: US 12,143,154 B2
(45) Date of Patent: Nov. 12, 2024

(54) DUAL GPON SMALL FORM-FACTOR PLUGGABLE OPTICAL MODULE

(71) Applicant: ALTICE LABS, S.A., Aveiro (PT)

(72) Inventors: Cláudio Emanuel Gomes Ferreirinho Lima Rodrigues, Aveiro (PT); Paulo Jorge Da Costa Mão Cheia, Aveiro (PT); Joaquim Fernando Vale E Serra, Aveiro (PT); Tiago Manuel Campos, Aveiro (PT); Luis Miguel Amaral Henriques, Aveiro (PT)

(73) Assignee: ALTICE LABS, S.A., Aveiro (PT)

( * ) Notice: Subject to any disclaimer, the term of this patent is extended or adjusted under 35 U.S.C. 154(b) by 33 days.

(21) Appl. No.: 17/996,836

(22) PCT Filed: Apr. 12, 2021

(86) PCT No.: PCT/IB2021/052998
§ 371 (c)(1),
(2) Date: Oct. 21, 2022

(87) PCT Pub. No.: WO2021/214585
PCT Pub. Date: Oct. 28, 2021

(65) Prior Publication Data
US 2023/0283378 A1    Sep. 7, 2023

(30) Foreign Application Priority Data
Apr. 22, 2020   (PT) .......................... 116279

(51) Int. Cl.
*H04B 10/40*       (2013.01)
*G02B 6/42*        (2006.01)

(52) U.S. Cl.
CPC ........... *H04B 10/40* (2013.01); *G02B 6/4246* (2013.01)

(58) Field of Classification Search
CPC .............................. H04B 10/40; G02B 6/4246
See application file for complete search history.

(56) References Cited

U.S. PATENT DOCUMENTS

| | | | | |
|---|---|---|---|---|
| 7,275,937 B2 * | 10/2007 | Ellison | ................. | G02B 6/4283 |
| | | | | 439/67 |
| 7,335,033 B1 * | 2/2008 | Edwards, Jr. | ........ | G02B 6/4246 |
| | | | | 439/76.1 |
| 7,450,494 B2 * | 11/2008 | Koyuncuoglu | ........... | H04J 3/14 |
| | | | | 370/386 |

(Continued)

OTHER PUBLICATIONS

International Search Report and Written Opinion, issued by International Searching Authority in International Application No. PCT/IB2021/052998, mailed on Jul. 21, 2021.

*Primary Examiner* — Pranesh K Barua
(74) *Attorney, Agent, or Firm* — ArentFox Schiff LLP

(57) ABSTRACT

The present invention relates to a dual GPON Small Form-Factor Pluggable optical module, projected to provide connection to two SC optical fiber connectors, and to be incorporated in any state of the art SFP transceiver host to allow double GPON-OLT channels. The module comprises a case housing a specific set of technical elements such as bidirectional optical subassemblies, high-speed electrical interface, and all the necessary electronic circuits, printed circuit board and flex-printed circuit board to ensure proper assembly and electronic performance of all elements.

13 Claims, 4 Drawing Sheets

(56) References Cited

U.S. PATENT DOCUMENTS

| | | | |
|---|---|---|---|
| 7,471,897 B1* | 12/2008 | Theodoras, II | H04B 10/035 |
| | | | 398/22 |
| 9,692,511 B1* | 6/2017 | Webman | H04B 10/0795 |
| 10,361,777 B2* | 7/2019 | Mentovich | H04B 10/075 |
| 2005/0157474 A1* | 7/2005 | Larson | H01R 13/6335 |
| | | | 361/728 |
| 2012/0275784 A1 | 11/2012 | Soto et al. | |
| 2013/0322832 A1* | 12/2013 | Wang | G02B 6/4261 |
| | | | 385/92 |
| 2014/0219652 A1* | 8/2014 | Peng | H04B 10/40 |
| | | | 398/41 |
| 2016/0248534 A1* | 8/2016 | Kuang | H04B 10/503 |
| 2017/0099131 A1 | 4/2017 | Bosch | |

\* cited by examiner

| Pin No. | PIN Assignment |
|---|---|
| 1 | GPON1_TD+ |
| 2 | GPON1_TD- |
| 3 | GND |
| 4 | SDA |
| 5 | SCL |
| 6 | GPON1_RD- |
| 7 | GPON2_Reset |
| 8 | GPON2_SD |
| 9 | Trig_TxDisable |
| 10 | GPON1_RD+ |
| 11 | GND |
| 12 | GPON2_RD- |
| 13 | GPON2_RD+ |
| 14 | GPON1_SD |
| 15 | VccR |
| 16 | VccT |
| 17 | GPON1_Reset |
| 18 | GPON2_TD+ |
| 19 | GPON2_TD- |
| 20 | GND |

Figure 3

DUAL GPON SMALL FORM-FACTOR PLUGGABLE OPTICAL MODULE

CROSS-REFERENCE TO RELATED APPLICATIONS

This application is a National Stage entry of International Application No.: PCT/IB2021/052998, filed Apr. 12, 2021, which claims priority to Portuguese Patent Application No. 116279, filed Apr. 22, 2020. The disclosures of the priority applications are hereby incorporated in their entirety by reference.

FIELD OF THE INVENTION

The present invention is enclosed in the area of gigabit passive optical network line terminals (GPON-OLT), particularly in the field of small form-factor pluggable (SFP) modules.

PRIOR ART

Gigabit-capable Passive Optical Network (GPON) have been widely spread among operators allowing the distribution of high bandwidth, large coverage and providing high efficiency to deliver broadband. Based on International Telecommunication Union-Telecommunication Standardization Sector (ITU-T) G.984.x-GPON-OLTs commonly use SFP transceiver hosts equipped with SFPs in a single fiber bidirectional SC connector configuration for carrying out the transmission and reception of the passive optical network (PON) data.

Problem to be Solved

Current GPON SFP optical transceiver modules employ a single fiber bidirectional SC connector, limiting the port density on the GPON-OLT, where a single SFP transceiver host equipped with a SFP is adapted to feed a GPON, limiting the number of users connected to said host and thereby limiting also its density.

The present invention addresses the above problem.

SUMMARY OF THE INVENTION

The present invention relates to a dual GPON Small Form-Factor Pluggable (DGPONSFP) optical module, projected to provide connection to two SC optical fiber connectors, and to be incorporated in any state of the art GPON-OLT.

Due to the set of particular technical features that characterizes the DGPONSFP optical module developed, it is not only possible to duplicate the number of users connected to the same SFP transceiver host's cage—that is, for the same cage space it allows to double the density of transceiver—but also allows transmitting and receiving two GPON channels in a single SFP optical transceiver.

DESCRIPTION OF FIGURES

FIG. 3 is a diagram of the DGPONSFP's module contact assignment of the high-speed electrical interface to the SFP transceiver host in order to support the dual GPON, according to certain aspects of the invention.

Figure 4:
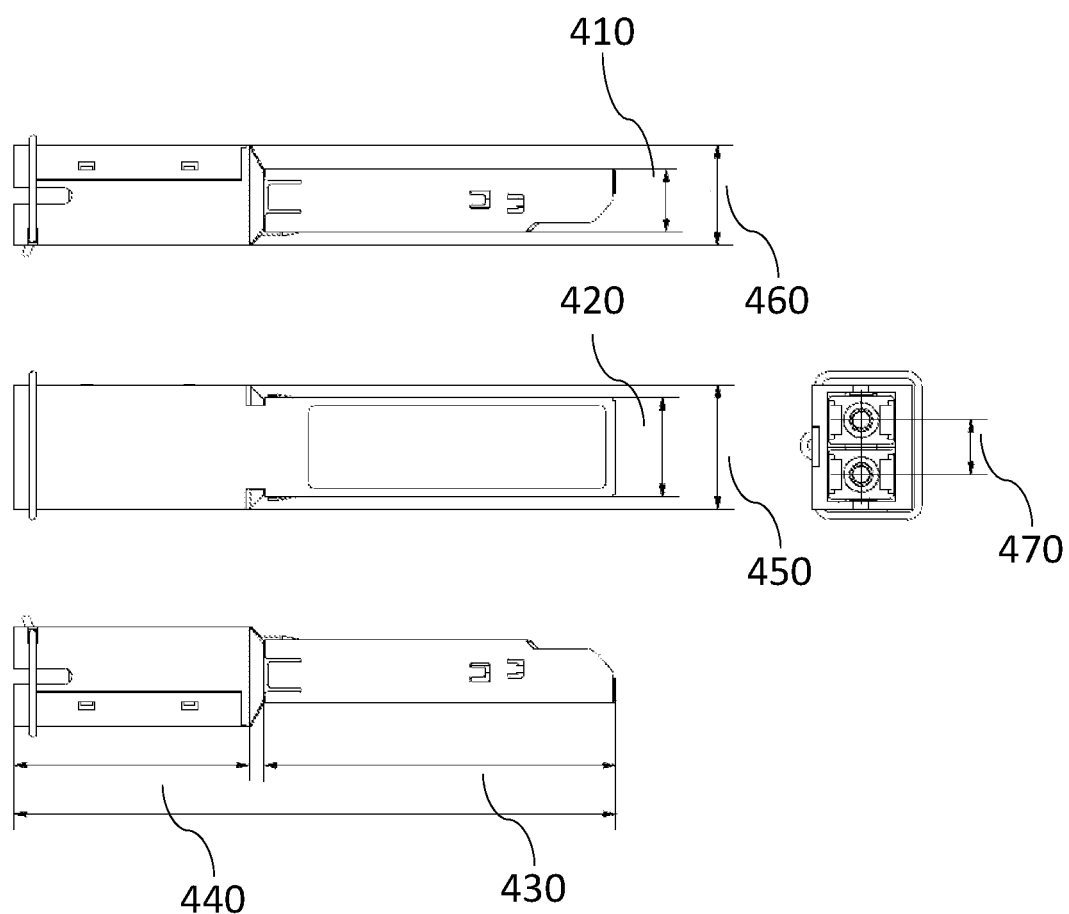

The module contact assignment is defined as:
 Pin number 1—GPON1_TD+—Transmit Non-Inverted GPON1 Data Input;
 Pin number 2—GPON1_TD-—Transmit Inverted GPON1 Data Input;
 Pin number 3—GND—Module ground;
 Pin number 4—SDA—2-Wire Serial Interface Data Line;
 Pin number 5—SCL—2-Wire Serial Interface Clock;
 Pin number 6—GPON1_RD-—Receive Burst Mode Inverted GPON1 Data output;
 Pin number 7—GPON2_Reset—Reset Receiver Burst Mode GPON2;
 Pin number 8—GPON2_SD—Receiver Signal Detect indicator for GPON2 receiver;
 Pin number 9—Trig_TxDisable—Two signals multiplex, which are selected by register: Receiver signal strength indication trigger and transmitter disable;
 Pin number 10—GPON1_RD+—Receive Burst Mode Non-Inverted GPON1 Data output;
 Pin number 11—GND—module ground;
 Pin number 12—GPON2_RD-—Receive Burst Mode Inverted GPON2 Data output;
 Pin number 13—GPON2_RD+—Receive Burst Mode Non-Inverted GPON2 Data output;
 Pin number 14—GPON1_SD—Receiver Signal Detect indicator for GPON1 receiver;
 Pin number 15—VccR—power supply for receiver;
 Pin number 16—VccT—power supply for transmitter;
 Pin number 17—GPON1_Reset—Reset Receiver Burst Mode GPON1;
 Pin number 18—GPON2_TD+—Transmit Non-Inverted GPON2 Data Input;
 Pin number 19—GPON2_TD-—Transmit Inverted GPON2 Data Input;
 Pin number 20—GND—Module ground;

FIG. 4 is a view of the case of the DGPONSFP's optical module developed with a dual SC connector for integrating two GPON-OLT channels, according to certain aspects of the invention. The numerical references represent:
 410—height of the rear part;
 420—width of the rear part;
 430—length of transceiver to the rear part;
 440—front length;
 450—front width;
 460—front height;
 470—ferrule distance.

Figure 5:
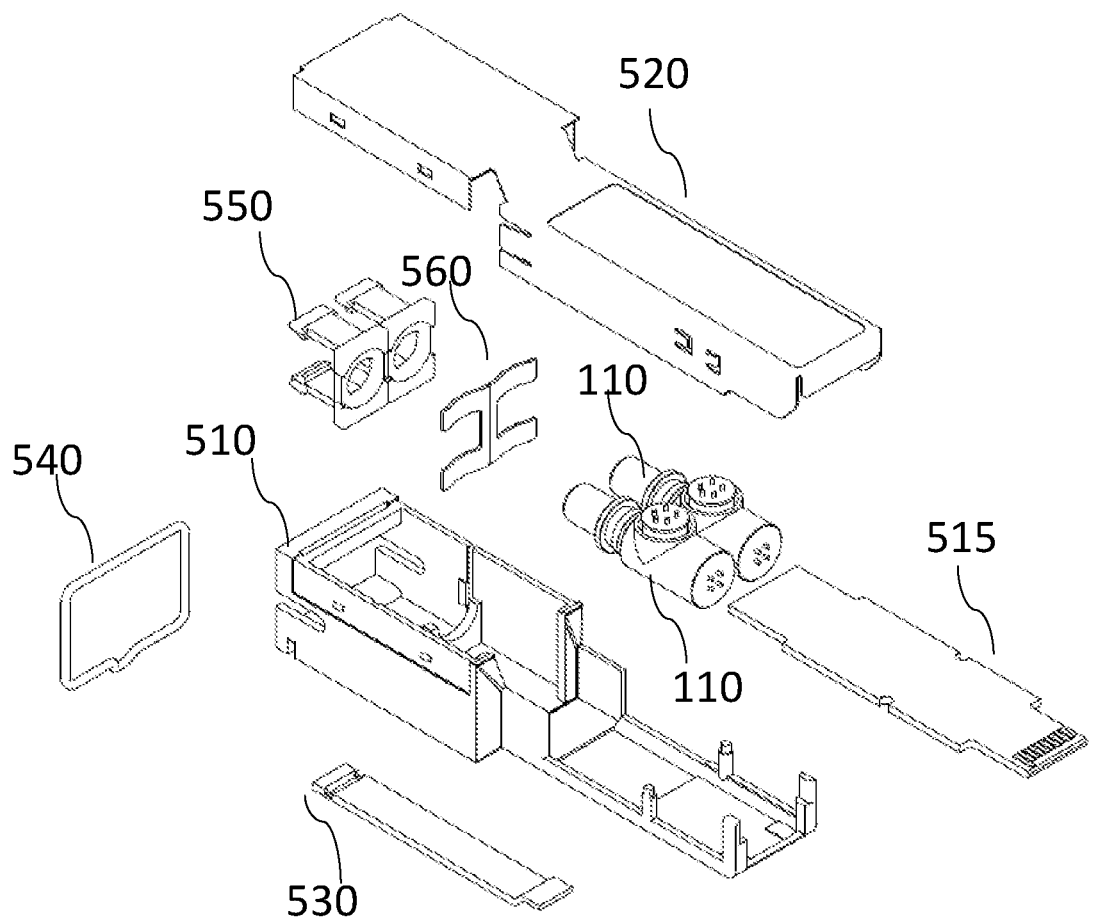

FIG. 5 is an exploded view of the case and internal components of the DGPONSFP optical module developed with a dual SC connector, according to certain aspects of the invention. The numerical references represent:
 110—bidirectional optical subassemblies;

115—printed circuit board;
510—bottom case;
520—top case;
530—actuator tines;
540—pull-tab;
550—SC bidirectional optical subassemblies support;
560—case spacer.

DETAILED DESCRIPTION

The following detailed description has references to the figures. Parts which are common in different figures have been referred to using the same numbers. Also, the following detailed description does not limit the scope of the disclosure.

The present invention relates to a DGPONSFP optical module comprising a dual SC connector, projected to be connected in a SFP transceiver host, allowing it to operate as a dual GPON transmitter and receiver.

According to the main embodiment of the invention, the DGPONSFP optical module (10) is comprised by at least two bidirectional optical subassemblies—BOSAs—(110), a control unit (111) comprising connection and processing means adapted to drive and control said BOSAs (110) and a high-speed electrical interface—HSEI—(112) adapted to provide connection to the SFP transceiver host, in order to feed several Optical Network Units. These elements comprising the DGPONSFP optical module (10) are housed in a case (113) which is to be installed inside the SFP transceiver host cage of an GPON-OLT.

Figure 1:
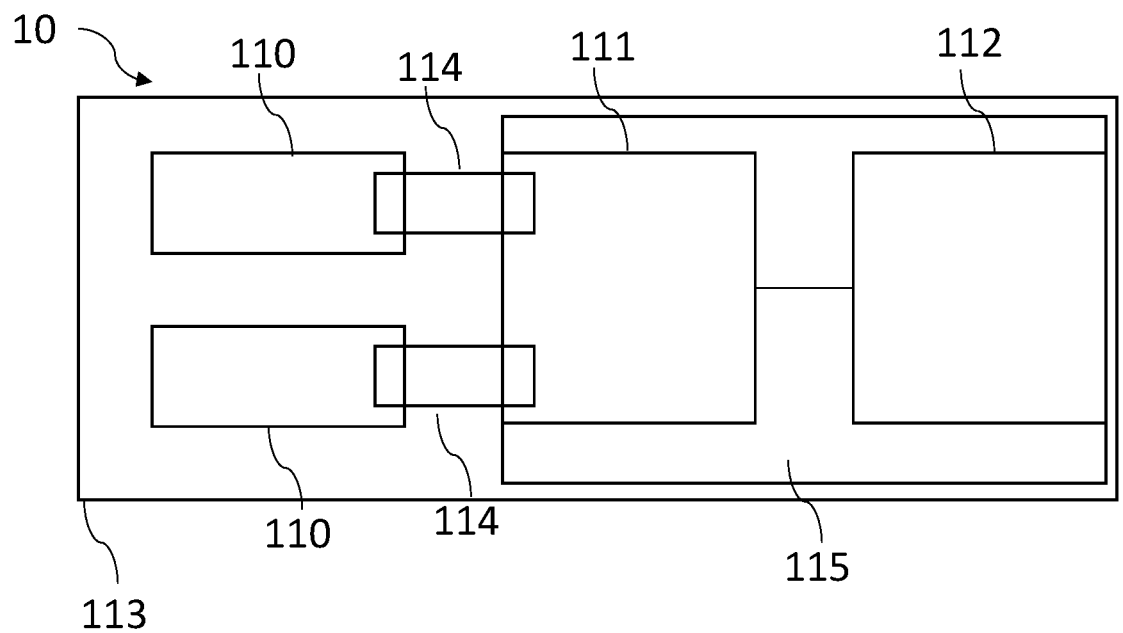
FIG. 1 is a schematic diagram of the DGPONSFP optical module developed, according to certain aspects of the invention. The numerical references represent:
 10—DGPONSFP optical module;
 110—bidirectional optical subassemblies;
 111—electrical circuit;
 112—high-speed electrical interface;
 113—case;
 114—flex-printed circuit board;
 115—printed circuit board.

FIG. 1 illustrates the block diagram of an exemplary embodiment of the DGPONSFP optical module (10) of the invention. It is comprised by the case (113) housing two BOSAs (110) for GPON-OLT connection, the control unit (111) and the high-speed electrical interface (112).

Each BOSA (110) is composed by a laser working on GPON downstream wavelength at 2.5 Gbit/s and a burst mode receiver working on GPON upstream wavelength at 1.25 Gbit/s. The BOSA (110) further includes an SC ferrule to allow the connection to an SC optical fiber connector. In the particular embodiment of the DGPONSFP module (10) developed as illustrated in FIG. 1, two BOSAs (110) provides connection to two SC optical fiber connectors.

Figure 2:
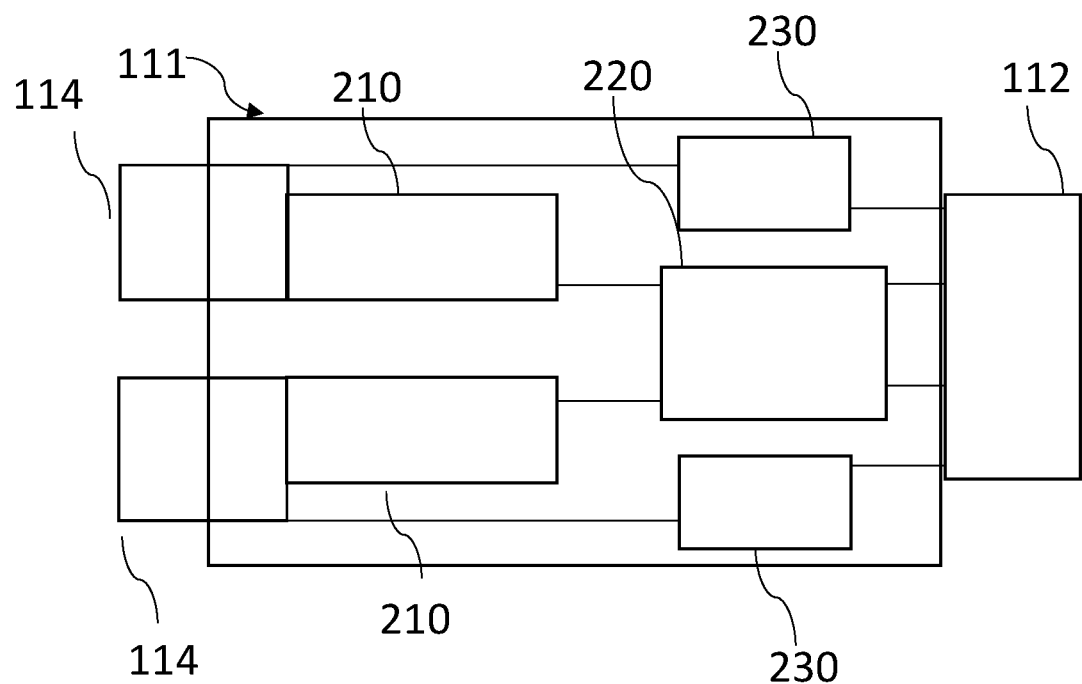
FIG. 2 is a schematic diagram of the DGPONSFP module's control unit, according to certain aspects of the invention. The numerical references represent:
 111—control unit;
 112—high-speed electrical interface;
 114—flex-printed circuit board;
 210—modulation sub-unit;
 220—microcontroller;
 230—power supply.

The control unit (111) is shown in FIG. 2, and is adapted to control the two BOSAs (110). For that purpose, the control unit (111) comprises a modulation sub-unit (210) and a microcontroller (220), besides the required circuit electronics that comprises resistors, capacitors, power supply (230) and ferrite bead. The modulation sub-unit (210) comprises laser drivers and limiting amplifiers adapted to drive and modulate the lasers and to amplify the electrical signals from the burst mode receiver of each BOSA (110). The microcontroller (220) is configured to control the modulation sub-units (210) and to communicate with the SFP transceiver host through the HSEI (112). The microcontroller (210) is also configured to control the BOSAs power supplies (230). In one embodiment, the two BOSAs (110) are connected to the control unit (111) through a flex printed circuit board (114). More particularly, each BOSA (110) is connected to the modulation sub-unit (210) of the control unit (111), and in particular to the respective laser driver and limiting amplifier, by means of the flexible printed circuit board (114), in order to guarantee the electronic performance. In another embodiment, the control unit (111) is mounted in a printed circuit board (115) containing all the necessary electrical connections between the different elements in order to control and drive the BOSAs (110).

The HSEI (112) is configured to provide a high-speed interconnection to the SFP transceiver host, in order to transmit electrical signals that were transformed by the DGPONSFP optical module (10) from the PON data received. Similarly, the DGPONSFP optical module (10) may receive electrical signals from SFP transceiver host via said port connector, in order to be transformed to optical signals and sent to a fiber network via optical connection.

For the purpose of that connection with the SFP transceiver host, the HSEI (112) comprises a port connector including a plurality of connection pins. In a particular embodiment, the port connector of the HSEI (112) is provided with a specific contact assignment, in order to ensure adaptability and compatibility with the state of the art SFP transceiver hosts. In accordance with a particular embodiment of the HSEI (112), FIG. 3 depicts a port connector and respective receptable which is comprised by twenty pins. In the referred embodiment, pins 3-5, 7, 9, 11-13, 15-16, and 18-20 may have the same signal as in a conventional GPON SFP pin assignment, and may be physically similar to the pin portion of a twenty-pin connector case used for conventional GPON SFP optical modules. This may allow the DGPONSFP optical module (10) now developed to be inserted into a SFP transceiver host configured to incorporate DGPONSFP optical modules or conventional GPON SFP optical modules. On the other hand, pins 1-2, 6,8, 10, 14, and 17 may be used for providing a second GPON channel. This allows for compatibility with conventional SFP optical transceivers, which are single channel module, and DGPONSEP modules (10), which may be a dual channel module. In the particular embodiment illustrated in FIG. 3, pin 6 is used to both disable the lasers transmission and to measure the optical input power on the receivers of the BOSA, representing the remote signal strength indication—RSSI. This pin function is selected on a memory pin map of the DGPONSFP module, through the SDA (data line) and SCL (clock line) pins, stored on the memory of the microcontroller (220), in order to act as transmitter disable of first BOSA (110), transmitter disable of second BOSA (110) or as RSSI of the first BOSA (110) and RSSI of the second BOSA (110).

FIG. 4 illustrates the mechanical case (113) design of the DGPONSFP optical module (10) developed. It assumes a standard size inside a cage assembly: height rear (410), width rear (420) and length of transceiver outside of cage to rear (430), following the Transceiver Multisource Agreement—MSA—in order to fit on a standard SFP Cage Assembly of the SFP transceiver host. The DGPONSFP optical module (10) dimensions outside of the cage MSA, in order to fit two SC connectors, assume a specific front length (440) of 31.8 mm, front width (450) of 16.8 mm, front height (460) of 13.5 mm and a BOSA ferrule distance (470) of 7.35 mm.

The DGPONSFP optical module comprises a case (113) which includes two SC BOSA supports (550) and a case spacer (560) adapted to accommodate the installation of the two BOSAs (110). Additionally, and as shown in FIG. 5, the case (113) may also comprise other mechanical parts such as a bottom case (510), a top case (520), one actuator tine (530) to allow the extraction of the DGPONSFP optical module (10) from the SFP transceiver host case, and a pull-tab (540) to allow to manually pull the DGPONSFP optical module (10).

The DGPONSFP optical module mechanical parts, (510), (520), (530), (540), (560) from several types of metallic materials as zinc alloys, zamak 2, zamak 3 or aluminium. The SC BOSA supports (550) are manufactured in plastic or metal.

The physical geometry of the DGPONSFP optical module (10) developed is to be such that it may fit within the receptacle case of a conventional GPON-OLT transceiver.

The DGPONSFP optical module (10) developed may be one of multiple DGPONSFP optical modules (10) incorporated into SFP transceiver hosts of a GPON-OLT. In certain embodiments, inserting a DGPONSFP optical module (10) into a SFP transceiver host configured to operate with conventional GPON SFP optical modules, may result in the DGPONSFP optical module (10) be only able to establish a single optical connection. Similarly, adding a conventional GPON SFP optical modules to a SFP transceiver host configured to operate with a DGPONSFP optical module may limit the transceiver to only a single optical GPON connection.

As will be clear to one skilled in the art, the present invention should not be limited to the embodiments described herein, and a number of changes are possible which remain within the scope of the present invention.

Of course, the preferred embodiments shown above are combinable, in the different possible forms, being herein avoided the repetition all such combinations.

The invention claimed is:

1. A dual gigabit passive optical network small form-factor pluggable—DGPONSFP—optical module configured to be incorporated in a small form-factor—SFP transceiver host of a gigabit passive optical network line terminal—GPON-OLT—characterized by comprising:
   a case configured to house:
   two bidirectional optical subassemblies—BOSAs—, wherein each BOSA is configured to provide connection to a GPON-OLT; each of the BOSAs comprising an SC ferrule adapted to provide connection to an SC optical fiber connector;
   a control unit comprising connection means, adapted to provide connection to each BOSA, and a microcontroller comprising processing means configured to control an operation of each BOSA; and a high-speed electrical interface—HSEI—adapted to provide connection between the microcontroller and a SFP transceiver host where the DGPONSFP is incorporated,
   wherein the HSEI is configured to provide connection to the SFP transceiver host where the DGPONSFP is incorporated by means of a port connector including only twenty pins and wherein a single pin of the twenty pins is configured to both disable transmission and to measure an optical input power on receivers of the BOSAs.

2. The DGPONSFP optical module according to claim 1, wherein each BOSA comprises a laser, adapted to operate at gigabit passive optical network—GPON downstream wavelength at 2.5 Gbit/s, and a burst mode receiver adapted to operate at GPON upstream wavelength at 1.25 Gbit/s.

3. The DGPONSFP optical module according to claim 2, wherein the control unit comprises:
   a modulation sub-unit including two laser driver and limiting amplifier elements, adapted to drive and modulate the lasers and to amplify electrical signals from the burst mode receiver of each BOSA;
   and wherein, the microcontroller is further configured to control the operation of the modulation sub-unit.

4. The DGPONSFP optical module according to claim 3, wherein a connection between each BOSA and the respective laser driver and limiting amplifying of each modulation sub-unit is provided through a flex printed circuit board.

5. The DGPONSFP optical module according to claim 4, wherein
   the microcontroller further comprises memory means adapted to store a memory pin map of the port connector; the microcontroller being further programmed to select pin function of each pin of the port connector based on the memory pin map.

6. The DGPONSFP optical module according to claim 1, wherein the case comprises following parts: two SC BOSA supports and a case spacer to accommodate installation of the two BOSAs.

7. The DGPONSFP optical module according to claim 6, wherein the case further comprises the following parts:
   a bottom and a top part;
   one actuator tine adapted to allow extraction of the DGPONSFP optical module from a SFP transceiver host's cage where it is incorporated;
   a pull-tab to allow a manual pull of the DGPONSFP module.

8. The DGPONSFP optical module according to claim 6, wherein the two SC BOSA supports are made from a plastic material.

9. The DGPONSFP optical module according to claim 6 wherein elements of the case are made from metal.

10. The DGPONSFP optical module according to claim 9, wherein the case is made from zinc alloys, zamak 2, zamak 3 or aluminium.

11. The DGPONSFP optical module according to claim 1, wherein a size of the case is standardized in order to fit within a receptacle cage of a SFP transceiver host.

12. A SFP transceiver host comprising at least one DGPONSFP optical module as claimed in claim 1.

13. A GPON-OLT comprising at least one SFP transceiver host as claimed in claim 12.

* * * * *